May 5, 1970
J. HERMANN
3,510,668
GONIOMETER WITH REFERENCE LIGHT SOURCE FOR
COMPENSATING FOR INACCURACIES IN RETICLE
Filed Sept. 27, 1965
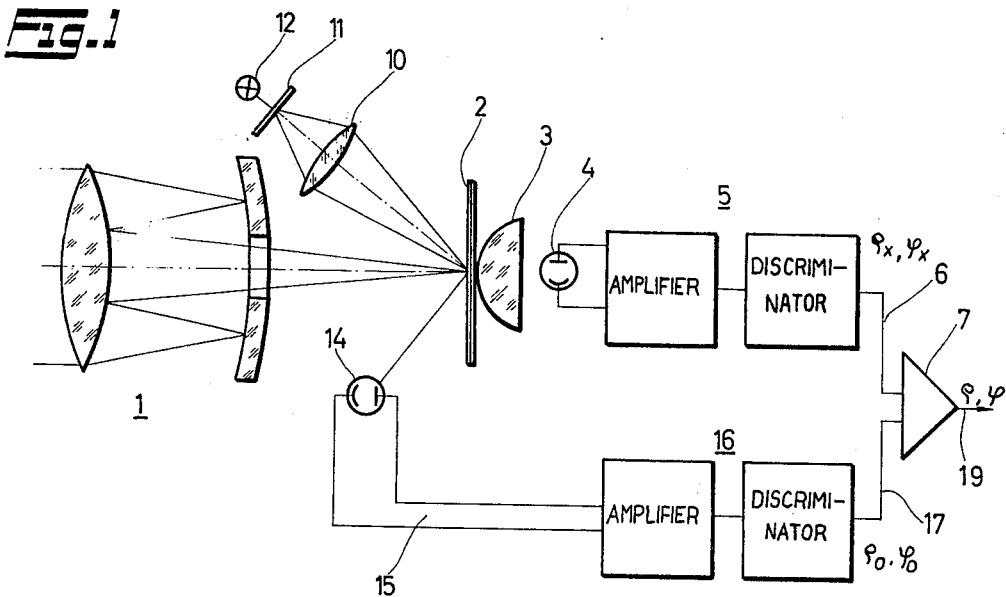
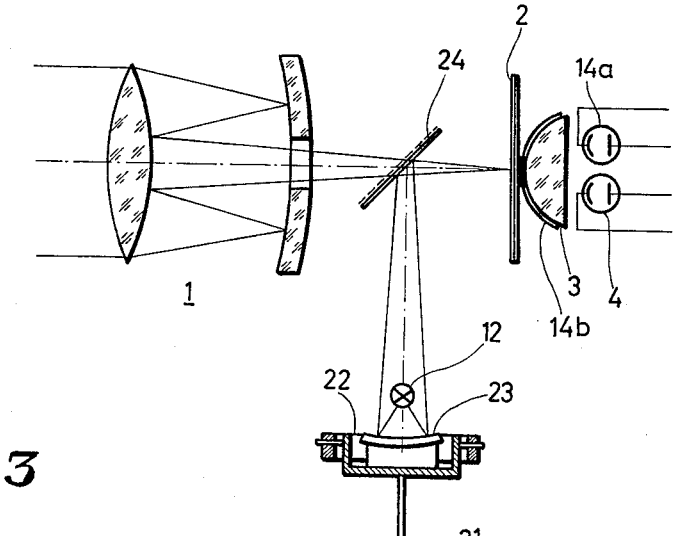
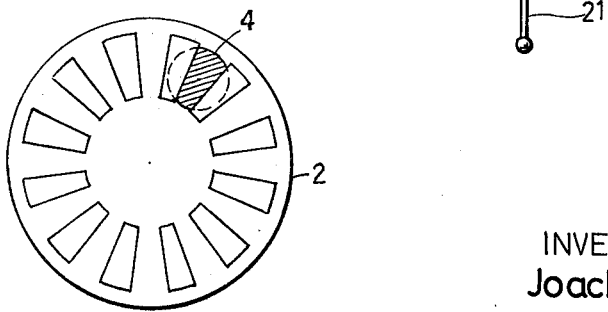
INVENTOR
Joachim Hermann
By McGlew and Toren
ATTORNEYS United States Patent Office 3,510,668
Patented May 5, 1970

3,510,668
GONIOMETER WITH REFERENCE LIGHT SOURCE FOR COMPENSATING FOR INACCURACIES IN RETICLE
Joachim Hermann, Munich, Germany, assignor to Bolkow Gesellschaft mit beschrankter Haftung, Ottobrunn, near Munich, Germany
Filed Sept. 27, 1965, Ser. No. 490,511
Claims priority, application Germany, Oct. 6, 1964, B 78,812
Int. Cl. G01d 5/36
U.S. Cl. 250—233
10 Claims

ABSTRACT OF THE DISCLOSURE

Optical tracking apparatus, for determining the angular deviation of a scanned object from a reference direction includes optical means directing energy from the object onto an image plane and having an optical axis centered on the reference direction. Converter means adjacent the image plane convert optical indications into corresponding electrical signals. A single diaphragm at the image plane scans the field of view of the optical means and provides an optical indication of the angular deviations of the object from the reference direction. The single diaphragm modulates the energy incident upon the converter means to provide a frequency modulated angular deviation electrical signal representing the polar coordinates of the scanned object relative to the reference direction. Null signal generating means includes a light source, means directing light from the source to the image plane at the optical axis, and a second converter means converting light from the source into corresponding electrical signals. The single diaphragm modulates the light incident upon the second converter means to provide a frequency modulated null electrical signal representing the polar coordinates of error deviations of the single diaphragm relative to the reference direction. The angular deviation signal and the null deviation signal are combined to correct the angular deviations signal for the error deviations of the diaphragm relative to the reference direction.

This invention relates to optical tracking apparatus for determining the angular deviation of a scanned object from a reference direction and, more particularly, to a novel method and means, usable with such an optical tracking apparatus, for correcting derived angular deviation signals for angular deviations of a scanning means from the reference direction.

As is known to those skilled in the art, optical tracking devices are used to determine automatically the angular deviation of an object, appearing in the field of view or image plane of the locating device, from a reference direction and to convert the optical indications of such angular deviations into corresponding or analogous electrical angular deviation signals. As a rule, the field of view or image field of such locating devices is scanned by means of a rotating and/or nutating diaphragm driven by a constant speed motor and having a number of radial spokes at equal angular distances from each other. An electro-optical converter is positioned behind the diaphragm and furnishes a pulsating electric voltage as a function of the optical indication which is revolving in relation to the axis of rotation of the diaphragm. The frequency of this pulsating voltage remains constant when the optical indication image circle is concentric with the axis of rotation of the diaphragm, but varies when the image circle is eccentric with respect to the axis of rotation of the diphragm.

In the first case, the object picked up by the locating device is present in the sighting or reference direction while, in the second case, the object is outside the reference direction of the locating device. The frequency variation or modulations of the pulsating voltages are approximately proportional to the angular deviation of the sighted object from the reference direction.

This method of measuring angular deviations of an object requires a high synchronization of the drive of the diaphragm, as well as precision formation of the diaphragm. Otherwise, any irregularity in the drive, in the geometry, or in both appears as an angular error.

In order to eliminate the effects of irregular angular velocities in tracking devices using prisms for scanning purposes, it is known to provide the prism scanning device, which is arranged in advance of the converter, with magnetically scannable marks. By using a magnetic sensor or feeler, there is produced, during rotation of the scanning device, a reference frequency. By means of a suitable circuit arrangement, this reference frequency can be coupled with the signal voltages furnished by the converter in such a manner that the angle errors caused by irregular speeds of rotation of the scanning device are compensated.

However, an apparatus of this type is not suitable to eliminate the effect of faulty division of the diaphragm spokes, or of radial beating in scanning devices caused by a diaphragm having radial spokes which are at unequal angular spacings, as the reference frequency produced in the above-mentioned manner merely represents the properties of the drive of the scanning device.

An object of the present invention is to provide an optical tracking device including signal generating means operable to generate null deviation signals corresponding to angular deviations of a scanning means from a reference direction.

Another object of the invention is to provide an optical tracking device including scanning means and signal generating means operable to generate null deviation signals corresponding to angular deviations of the scanning means from the reference axis, and in which the scanning means is included in said signal generating means.

Also an object of the invention is to provide a novel method, for use with optical tracking apparatus, for correcting measured angular deviation signals for angular deviations of a scanning means relative to the reference direction.

A further object of the invention is to provide an optical tracking device including signal generating means operable to generate null deviation signals corresponding to angular deviations of the scanning means from a reference direction and in which the signal generating means comprises a light source which is focused to a spot directed at the scanning device at the sighting axis or axis of rotation thereof, and including means reflecting the light rays to converter means for converting the resulting optical indications into electric signals representing the angular deviations of the scanning means from the reference direction.

Still another object of the invention is to provide an optical tracking device of the type just mentioned in which reflection of the light rays is effected by a screen or grating interrupting the light rays.

Still a further object of the invention is to provide an optical tracking device of the type just mentioned in which the converter means comprises an electro-optical converter such as a photo resistance cell, a photo diode, or the like.

When there is agreement between the reference direction and the sighting direction of the scanning means, the null deviation signals have a constant frequency. However, if, whether due to inaccuracies in the manufacture of the diaphragm or in its suspension, or whether due to irregular angular velocity of the diaphragm, the sighting axis differs from the reference direction, the null deviation signal represents this deviation exactly and is frequency modulated in accordance with the deviation. Due to the use, in the preferred embodiment of the invention, of a location screen or grating for generating the null deviation signals, the scale of this frequency modulation is identical with the scale of the angular deviation signals.

The generated scanning means null deviation signals are combined, in a known manner and using suitable electric circuitry, with the angular deviation signals furnished by the converter means of the tracking device. The combined signals represent, in polar coordinates or vectorially, the angular deviation of a scanned object in the field of view of the tracking device, as compared to the reference direction, in such a manner that the error in the angular deviation signals caused by irregular devisions of the diaphragm, by radial play of the diaphragm, or by radial beat of the diaphragm suspension, are compensated. Circuits of this type, performing the subtraction of a correction vector from a measurement vector, are known from analog computer technology.

In accordance with the invention, it is possible to carry out the derivation of the difference in a manner such that the number of variations of the null deviation signals is subtracted from the number of variations of the angular deviation signals through respective periods each representing a successive one-half revolution of the scanning drive.

Another object of the invention is to provide an optical tracking apparatus of the type mentioned and including signal generating means operable to generate electrical null deviation signals, in which the mentioned light source has a different spectral range than the electro-optical converter of the tracking apparatus.

A further object of the invention is to provide an optical tracking apparatus of the type mentioned in which the reference direction may be adjustable and preferably in a manner such that the light source of the null deviation signal generating means is adjustable about two axes which are perependicular to each other.

Yet another object of the invention is to provide an optical tracking apparatus of the type just mentioned in which the light source for the null deviation signal generating means is adjusted under manual control, with cardan-suspended deflecting means being provided for the light source. In this manner, additional signal data can be introduced into the optical tracking apparatus.

For an understanding of the principles of the present invention, reference is made to the following description of typical embodiments thereof as illustrated in the accompanying drawings.

In the drawings:

FIG. 1 is a somewhat schematic and block diagram of optical tracking apparatus embodying the invention and incorporating the invention signal generating means;

FIG. 2 is a view similar to FIG. 1, but illustrating means for manually adjusting the null deviation signal generating means; and FIG. 3 is an elevation view of one form of nutating diaphragm useable with optical tracking apparatus embodying the invention.

In order to facilitate understanding of the invention, only those parts of an optical tracking device which are in direct functional relation with the apparatus for generating the null deviation signals have been illustrated in the drawing. The optical tracking apparatus will be hereinafter referred to as a "goniometer."

Thus, and referring to FIG. 1, the apparatus is illustrated as including an objective 1, a diaphragm 2, rotated in a manner not illustrated and usually referred to as an analyzer or reticle, a field lens 3, an electro-optical converter 4, and a measuring channel 5 including an amplifier, a discriminator, and associated components. Measuring channel 5 is connected, through a line connection 6, for supplying, to summing amplifier 7, the electrical angular deviation signals corresponding to the polar coordinates $\rho_x$, $\varphi_x$ of an object in the field of view of the goniometer.

The reference or null signal generating means generates the reference signals $\rho_0$ and $\varphi_0$ corresponding to the polar coordinates $\rho_x$ and $\varphi_x$. This null signal generating means includes an optical system generally indicated at 10 for directing the rays of light source 12 through an apertured diaphragm 11 onto the center or axis of the field of view of the goniometer. Diaphragm 11 serves to "stop down" the light rays to provide a substantially point effect.

Diaphragm 2, which is rotating during a locating operation, reflects the rays of light source 12 onto an electro-optical converter 14. The output 15 of converter 14 is connected to a null deviation signal channel 16 likewise including an amplifier, a discriminator and associated components. Through the medium of line connection 17, the null deviation signal furnished by converter 14, and which is preferably frequency modulated, is furnished to the difference amplifier 7 together with the angular deviation signals supplied through the line connection 6. Difference amplifier 7 provides the difference between the supplied signal voltages. The measuring voltages $\rho$ and $\varphi$, representing, in polar coordinates, the angular deviation of an object appearing in the field of view of the goniometer, are derived at the output 19 of amplifier 7. These measuring voltages are free from error influences caused by drive inaccuracies, faulty division of the diaphragm, diaphragm play, or diaphragm beat.

Preferably, the spectrum of the rays produced by light source 12 is so selected that the functioning of the goniometer is not disturbed by these rays. For this purpose, it is particularly suitable to use a light source producing violet or ultra violet rays. It is further advantageous if diaphragm 2 is designed to be selectively reflecting with respect to radiation from the light source 12, and to have its interstices or its webs permeable to radiation incident through objective 1.

For the purposes of adjustment, and particularly for the purpose of adjusting the reference direction or null point, as produced in the manner just described, light source 12 may be displaceably mounted for adjustment about two axes normal to each other, one of which lies in the plane of the drawing. Referring to FIG. 2, the reference signal generator is manually controllable. For this purpose, reflecting means such as a hollow or concave mirror 23, are mounted in cardan mounting 22 which is adjustable through a manual setting means 21. Through the medium of a partially silvered mirror 24, light rays from source 12, positioned at the focal point of mirror 23, are directed into the center of the field of view of the goniometer. FIG. 2 likewise illustrates, with respect to the goniometer, only objective 1, diaphragm 2, field lens 3 and the electro-optical converters 4 and 14.

With respect to the arrangement of converter 14, there are two possibilities as illustrated. In one case, converter 14a may be directly adjacent converter 4 and, in this case, field lens 3 must be light permeable over a wide spectral range and have only a very small dispersion. In another arrangement, light converter 14b may be arranged as a selectively absorbing, thin-layer, photo-diode on either the forward or rear face of field lens 3. In this case, the thin-layer diode, which may consist of Ge or Si, is vapor deposited on field lens 3.

The additional signal data introduced into the goniometer through the hand setting member 21 may represent, for example, certain test deviation positions with the measuring signals suppressed. Furthermore, in the absence of automatic location of an object in the field of view of the goniometer, which may be due, for example, either to too great a distance or to too weak a radiation, manual guiding of the goniometer may be effected.

As will be apparent from the foregoing, the construction of optical tracking apparatus of the type mentioned is simplified and costs greatly reduced, as the requirements for precision of critical parts of a tracking device are considerably reduced owing to the novel method of generating a null reference signal.

What is claimed is:

1. Optical tracking apparatus for determining the angular deviation of a scanned object from a reference direction, said apparatus comprising, in combination, optical means collecting and focusing energy from said object onto an image plane and having an optical axis centered on said reference direction; first electro-optical converter means positioned adjacent said image plane to convert optical indications into corresponding electrical signals; scanning means, including a single diaphragm at said image plane, scanning the field of view of said optical means and providing an optical indication of the angular deviations of the scanned object from said reference direction; said single diaphragm modulating the energy incident upon said first converter means to provide, at the output of said first converter means whenever the image of the scanned object is displaced from said optical axis, a frequency modulated angular deviation electrical signal representing the polar coordinates of the scanned object relative to said reference direction; null signal generating means including a light source, means directing light from said source to said image plane at said optical axis, and second electro-optical converter means converting light from said source into corresponding electrical signals; said single diaphragm modulating the light incident upon said second converter means to provide, at the output of said second converter means, a frequency modulated null electrical signal representing the polar coordinates of error deviations of said scanning means relative to said reference direction; and means combining said angular deviation signal and said null signal to correct said angular deviation signal for error deviations of said scanning means relative to said reference direction.

2. Optical tracking apparatus for determining the angular deviation of a scanned object from a reference direction, as claimed in claim 1, including means mounting said light source and said means directing light from said light source, to adjust said reference direction.

3. Optical tracking apparatus for determining the angular deviation of a scanned object from a reference direction, as claimed in claim 1, in which said first and second electro-optical converter means are responsive to respective different light spectra.

4. Optical tracking apparatus for determining the angular deviation of a scanned object from a reference direction, as claimed in claim 1, in which said second electro-optical converter means is responsive to light rays in the violet and ultra-violet ranges.

5. Optical tracking apparatus for determining the angular deviation of a scanned object from a reference direction, as claimed in claim 1, in which said single diaphragm transmits energy therethrough to said first electro-optical converter means and reflects light from said light source to said second electro-optical converter means.

6. Optical tracking apparatus for determining the angular deviation of a scanned object from a reference direction, as claimed in claim 1, in which said single diaphragm transmits therethrough energy to said first electro-optical converter means and transmits therethrough energy from said light source to said second electro-optical converter means; said second electro-optical converter means being positioned adjacent said image plane.

7. Optical tracking apparatus for determining the angular deviation of a scanned object from a reference direction, as claimed in claim 6, including a field lens positioned between said single diaphragm and said electro-optical converter means; said second electro-optical converter means comprising a selectively absorbent, thin-layer photo-diode on a surface of said field lens.

8. In optical tracking apparatus for determining the angular deviation of a scanned object from a reference direction and including optical means collecting and focusing energy from the object onto an image plane and having an optical axis centered on the reference direction, first electro-optical converter means positioned adjacent the image plane to convert optical indications into corresponding electrical signals, scanning means including a single diaphragm at said image plane scanning the field of view of the optical means and providing an optical indication of the angular deviations of the scanned object from the reference direction, the scanning means modulating the energy incident upon the first converter means to provide, at the output thereof whenever the image of the scanned object is displaced from the optical axis, a frequency modulated and angular deviation electrical signal representing the polar coordinates of the scanned object relative to the reference direction: the method of correcting the angular deviation signals for error deviations of the scanning means relative to the reference direction comprising the steps of directing light from a source to the image plane at the optical axis and then to second electro-optical converter means converting light from the source into corresponding electrical signals; utilizing said single diaphragm to modulate the light incident upon the second converter means to provide, at the output thereof, a frequency modulated null electrical signal representing the polar coordinates of error deviations of the scanning means relative to the reference direction; and combining the angular deviation signal and the null signal to correct the angular deviation signal for error deviations of the scanning means relative to the reference direction.

9. The method claimed in claim 8, including the step of adjusting the means directing light from the source to the image plane at the optical axis to adjust the reference direction to test selected deviation positions.

10. The method claimed in claim 9, including the step of introducing additional signal data into the optical tracking apparatus by such adjustment of the reference direction.

References Cited

UNITED STATES PATENTS

| 3,096,444 | 7/1963 | Seward | 250—231 |
| 3,177,362 | 4/1965 | Kutzschor et al. | 250—833 |

RALPH G. NILSON, Primary Examiner

M. ABRAMSON, Assistant Examiner

U.S. Cl. X.R.

250—204